Figure 1:
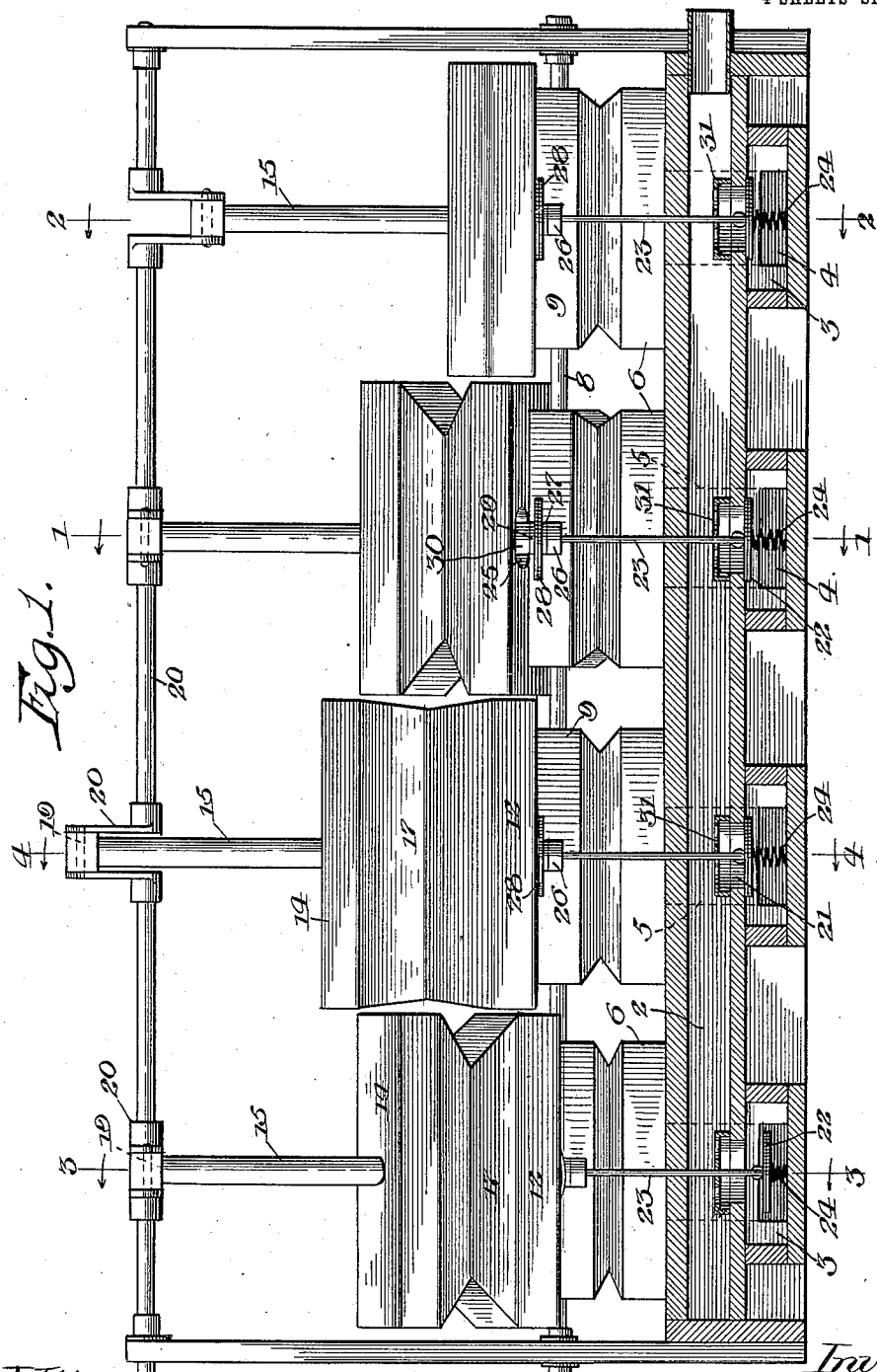

E. T. TURNEY.
MOTOR FOR PIANO PLAYERS.
APPLICATION FILED NOV. 13, 1909.

1,028,307.

Patented June 4, 1912.
4 SHEETS—SHEET 1.

Witnesses
Inventor
Eugene T. Turney
by Benj. T. Roodhouse
Atty

E. T. TURNEY.
MOTOR FOR PIANO PLAYERS.
APPLICATION FILED NOV. 13, 1909.
1,028,307.
Patented June 4, 1912.
4 SHEETS—SHEET 2.
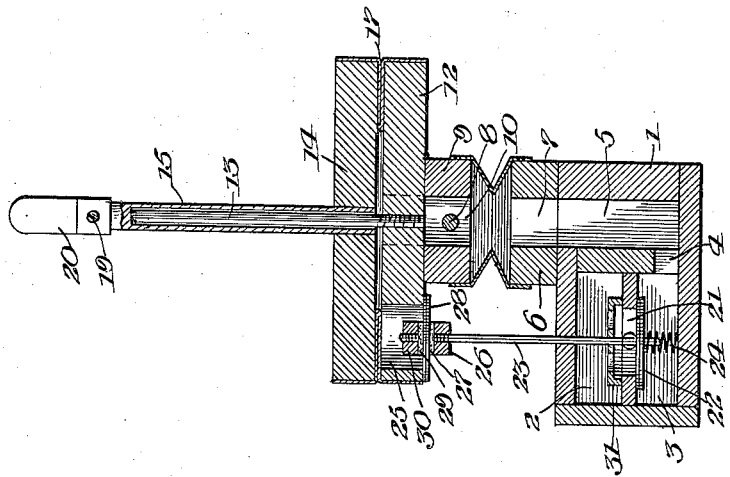
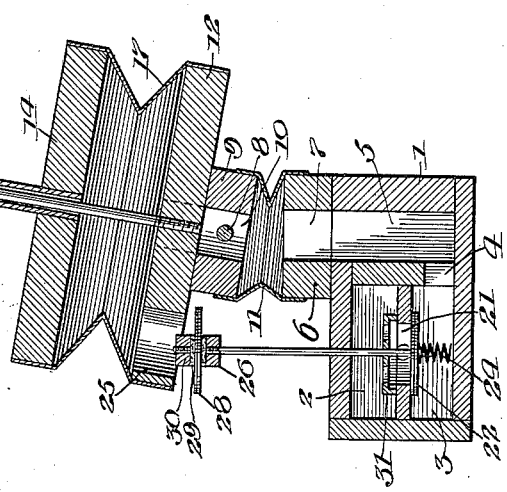

E. T. TURNEY.
MOTOR FOR PIANO PLAYERS.
APPLICATION FILED NOV. 13, 1909.
1,028,307.
Patented June 4, 1912.
4 SHEETS—SHEET 3.
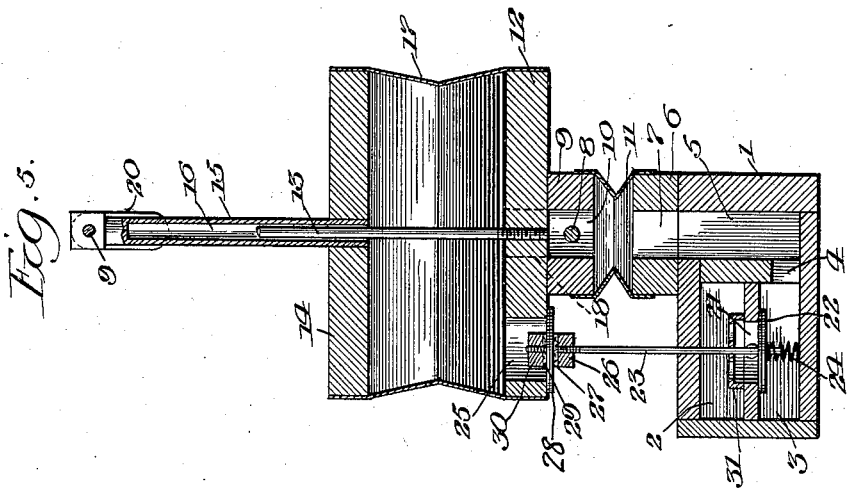
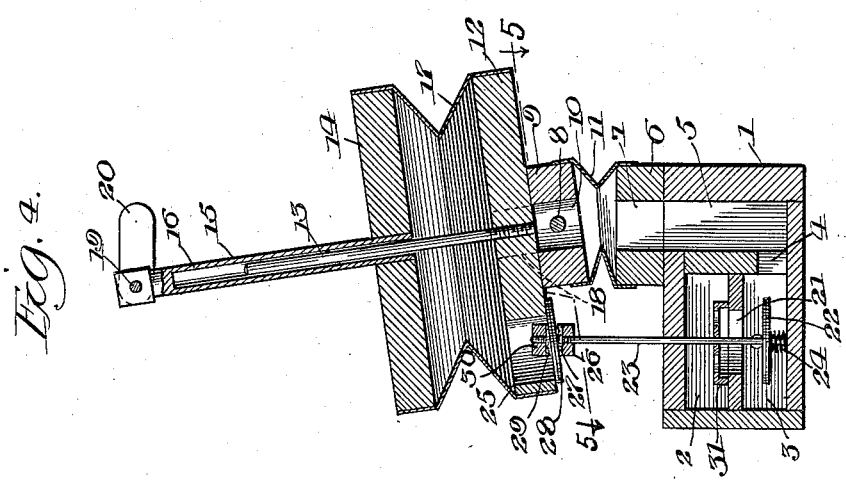
Witnesses
Inventor
Eugene T. Turney.
by Benj. T. Roadhouse
Atty E. T. TURNEY
MOTOR FOR PIANO PLAYERS.
APPLICATION FILED NOV. 13, 1909.
1,028,307.
Patented June 4, 1912.
4 SHEETS—SHEET 4.
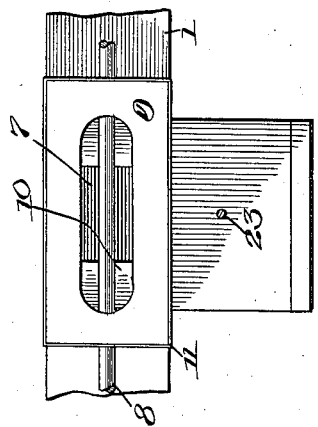
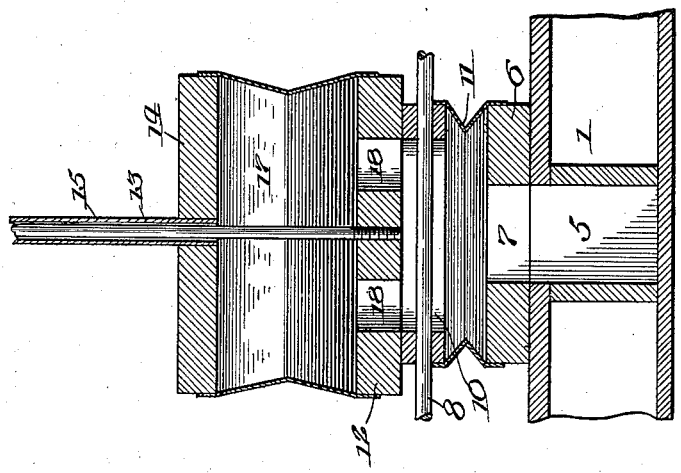

UNITED STATES PATENT OFFICE.

EUGENE T. TURNEY, OF DAVENPORT, IOWA, ASSIGNOR TO AMERICAN PNEUMATIC ACTION COMPANY, OF DAVENPORT, IOWA, A CORPORATION OF WEST VIRGINIA.

MOTOR FOR PIANO-PLAYERS.

1,028,307. Specification of Letters Patent. Patented June 4, 1912.

Application filed November 13, 1909. Serial No. 527,916.

*To all whom it may concern:*

Be it known that I, EUGENE T. TURNEY, a citizen of the United States, residing at Davenport, in the county of Scott and State of Iowa, have invented a new and useful Motor for Piano-Players, of which the following is a specification.

My invention relates to improvements in motor for piano players, which shall be driven by atmospheric pressure in connection with the partial vacuum used in such mechanisms for operating the keys of the piano.

The objects of my improvement are the production of a simple motor mechanism in which the parts are readily accessible for adjustment, repair and replacement. I attain these objects by the mechanism illustrated in the accompanying drawings, in which, Figure 1 is an elevation of my improvement; Fig. 2 is a transverse section upon the line, 1—1, of Fig. 1; Fig. 3 is a transverse section on the line 2—2, of Fig. 1; Fig. 4 is a transverse section on the line 3—3 of Fig. 1; Fig. 5 is a transverse section on the line 4—4, Fig. 1; Fig. 6 is a vertical, longitudinal section, through one of the bellows units; and Fig. 7 is a section on line 5—5, of Fig. 4.

Similar reference numerals refer to similar parts, throughout the several views.

The reference numeral, 1, designates a casing, which extends transversely across the bottom of my entire motor. In this casing I have provided a compartment, 2, which connects with the vacuum-producing mechanism, and in which is maintained at all times a partial vacuum. Directly below the campartment, 2, is a valve campartment, 3, in the front side of which is an opening, 4, into a vertically disposed channel, 5, which extends to the top of the casing, 1. Above the channel, 5, is a block, 6, having a channel, 7, therein, which registers with the channel, 5, and forms a continuation thereof. Located above the top of the block, 6 and channel, 7, is a rod, 8, upon which is pivoted a block, 9, similar in shape and size to the block, 6, and having therein a channel, 10, which comes directly above the channel, 7. The rod, 8, and block, 9, are so proportioned and disposed that there is some space between the block 9, and the block 6.

In this space I have provided the folding flexible connection, 11, which is similar to an ordinary bellows, and which connects blocks 6 and 9, and the channels, 7 and 10, and at the same time permits the blocks 9, to swing upon the rod, 8.

Mounted upon the block, 9, is the bellows-board or base, 12, and in the bellows-board or base, 12, is provided the rod, 13, which extends upwardly from the central portion thereof. I provide another bellows-block, 14, extending outwardly from the center of which is a rod, 15, in the center of which is provided a tubular chamber, 16, into which the rod, 13, upon the bellows-base, 12, extends. This construction secures the parallelism of the bellows-block, 14, with the bellows-base, 12. The usual flexible bellows-folds, 17, connect the bellows-base, 12, with the bellows-block, 14. In the bellows-base, 12, are provided apertures, 18, clearly shown in Fig. 6, which establish a connection between the bellows-folds, 17, and the channel, 10. The top of the rod, 15, is connected to a crank-pin, 19, which forms a portion of a crank-shaft, 20.

It will now be seen that when air is exhausted from the bellows-folds, 17, the atmospheric pressure will cause the collapsing of the bellows-folds and the depression of the bellows-block 14, thereby carrying down the rod, 15, and causing the rotation of the crank-shaft, 20, through the pin, 19. The pivotal mounting of the block 9, upon the rod, 8, will permit the entire bellows to swing transversely, as the crank-shaft, 20, is rotated.

In order to secure exhaustion of the air from the bellows-folds, 17, at the proper times, I have provided the following mechanism: A horizontally-disposed valve-port, 21, is located between the compartment, 2, and the compartment, 3, and a valve, 22, is located in the compartment, 3, for the closing of said valve-port, 21. The valve, 22, is provided with a valve-stem, 23, which extends from near the bottom of the compartment, 3, upwardly through the compartment, 2, above the casing, 1, to a point inside of the bellows-base, 12. A coiled spring, 24, is located upon the valve-stem, 23, and below the valve, 22, to yieldingly close the valve against the valve-port 21. In the bellows-base, 12, about the upper end of the valve-stem, 23, is provided an aperture, 25, leading from the outside air into the bellows-folds, 17. Upon the upper end of the valve-stem, 23, is provided a nut, 26, above which, and about the valve-stem, is a bit of felt or other flexible material, 27, and resting upon this felt, 27, is a valve, 28, which is proportioned to close the aperture, 25, in the bellows-base, 12, when the bellows-base, 12, contacts therewith. Another piece of felt or flexible material, 29, is located above the valve, 28, and a nut, 30, is screwed upon the top of the valve-stem, 23, to keep the mechanism in position. The object of mounting the valve 28, between the flexible washers 27 and 29, is to permit the valve to flex and follow or accommodate itself to the changing inclination of the bottom of the bellows.

Inside of the compartment, 2, and about the valve-port, 21, is a guide-plate, 31, through which the valve-stem, 23, extends, and by which it is guided.

As will be seen by reference to Fig. 1, I have provided four sets of bellows mechanism, as above described, attached at various angles to the crank-shaft, 20, so that there will be at least one bellows in a position to pull when a vacuum is produced in the compartment, 2.

The operation of my motor is as follows: When the crank-shaft is in a position shown in Fig. 5, the bellows-base, 12, is horizontal, and the valve, 28, is so disposed upon the valve-stem, 23, that in this position the valve closes the aperture, 25. Immediately upon the crank-shaft passing the center, in the direction to assume such a position as is shown in Fig. 4, the bellows is inclined upon its pivotal connection with the rod, 8, in the direction of the valve-stem, 23. This inclination serves to force downwardly the valve-stem, 23, and thereby depress the valve, 22, off the valve-port, 21. This establishes a connection between the chamber, 2, in which a vacuum is maintained, and the bellows-folds, 17, through the channels, 5, 7, and 10, thereby exhausting the air from the bellows and causing it to be collapsed by the atmospheric pressure. Fig. 3 shows the bellows at the end of the power-stroke, when it is fully collapsed. In this position the bellows-base, 12, will again be horizontal, and as soon as it passes the center to such a position as is shown in Fig. 2, it will be tilted in the opposite direction, or away from the valve-stem, 23. This will permit the spring, 24, to close the valve, 22, upon the valve-port, 21, and thereby disconnect the vacuum chamber, 2, from the bellows-folds, 17, and will at the same time raise the bottom of the base, 12, from the valve, 28, and permit the air from the outside atmosphere to enter the bellows-folds, 17, through the aperture, 25.

Having described my invention, what I claim as new and desire to secure by Letters Patent, is:—

1. In a motor in combination, a crank shaft, a bellows connected with said crank shaft and mounted to oscillate with the revolution thereof, and means for admitting air to and exhausting it from said bellows actuated by the oscillations thereof.

2. In a motor in combination, a crank shaft, a bellows having the base thereof pivoted, and the head connected with said crank shaft, said bellows having inlet and exhaust ports and valve mechanism for controlling said ports operated by the swing of said bellows upon its pivot.

3. In a motor in combination, a crank shaft, a bellows having the base thereof pivoted and the head connected with said crank shaft, the base of said bellows having a port located to one side of the pivot, and a valve located outside of said bellows so as to contact with said base and cover said port as said bellows is moved toward said valve by its oscillation.

4. In a motor, in combination a crank shaft, a pivoted bellows attached to said shaft and oscillated thereby, said bellows having an inlet port and an independently mounted valve located in the path of oscillation of said inlet port so as to cover and close the same during a portion of its oscillatory movement.

5. In a motor, in combination an oscillating bellows, a crank shaft attached thereto and driven thereby, said bellows having an inlet port and a flexibly mounted valve located in the path of oscillation of said port so as to be opened and closed by the oscillation of the bellows.

6. In a motor in combination, an oscillating bellows, a crank-shaft attached thereto and driven thereby, said bellows having inlet and outlet ports, and valves for controlling said ports operated by the oscillation of said bellows.

7. In a motor in combination, an oscillating bellows, a crank-shaft attached thereto and driven thereby, a vacuum chamber, said bellows communicating with said chamber through a port, and a valve controlling said port operated by the oscillation of said bellows.

8. In a motor in combination, a crank-shaft, a bellows having the base thereof pivoted and the head connected with said crank-shaft, a vacuum chamber connected with said bellows, and a valve controlling the connection between said chamber and said bellows, mounted upon a stem which extends to a point where it contacts with and is actuated by the base of said bellows as it swings upon its pivot.

9. In a motor in combination, a crank shaft and a bellows comprising a relatively fixed base, a movable head, connecting bellows-folds, a rod extending from said base through said head, and a connecting rod between said head and said shaft and recessed to receive said first-mentioned rod.

10. In a motor in combination, a crank-shaft, a recessed connecting rod, a bellows-head secured to said connecting rod, a pivoted bellows-base, bellows-folds connecting said head and said base, and a rod fixed to said base and extending into the recess in said connecting rod.

11. In a motor in combination, a crank shaft, a pivoted bellows having a port in a movable part thereof, a connecting rod extending between said bellows and said crank-shaft, and means for admitting and exhausting air to and from said bellows, said means including a valve disposed in the path of said port so as to open and close the port as the bellows moves on its pivot.

12. A motor, comprising a vacuum chamber, a passage leading therefrom, a pivotally mounted bellows-block connected with said passage, a rod mounted in the face of said block, another bellows-block, a rod recessed to receive said first-mentioned rod mounted in said last-mentioned block, a crank-shaft connected with said last mentioned rod, and means for admitting air to and exhausting it from said bellows.

13. In a motor in combination, bellows and means for exhausting air from and admitting air to said bellows, guide means for the movable bellows-head comprising a rod fixed to the bellows-base and passing through the bellows-head, and another rod fixed to the head and recessed to receive said first-mentioned rod.

14. In a motor in combination, a base, a movable head, a rod extending from said base through said head, a recessed rod attached to said head and surrounding said first mentioned rod, a crank-shaft attached to said recessed rod, bellows-folds connecting said base and said head and means operable by the motion of said bellows for admitting air to and exhausting it from said bellows.

15. A motor comprising in combination a bellows, a pivotal mounting for said bellows, a vacuum chamber, a flexible connection between said bellows and said chamber, a crank-shaft connected with said bellows, said bellows having a port leading to the atmosphere, and a port leading to said chamber, a valve stem, and valves on said stem for controlling said ports.

16. A motor comprising in combination a vacuum chamber, a pivotally mounted bellows, a flexible connection between said bellows and said chamber, openings being provided from said bellows to said vacuum chamber and to the atmosphere, and valves for controlling said openings operable by the oscillation of said bellows upon its pivot.

17. A motor comprising in combination a vacuum chamber, a bellows pivotally mounted above said chamber, a flexible connection between said bellows and said chamber, a valve port being provided between said chamber and said bellows, a valve port being provided also between said bellows and the atmosphere (directly over said first-mentioned valve port), and valves for said ports mounted upon the same valve stem and operated by the oscillation of said bellows.

18. A motor comprising in combination a vacuum chamber, a pivotally mounted bellows, ports being provided from said bellows to said chamber and to the atmosphere, and means operable by the oscillation of said bellows for simultaneously opening one and closing the other of said ports.

19. A motor comprising in combination a vacuum chamber, a pivotally mounted bellows, a conduit connecting said bellows with said chamber comprising bellows-folds of suitable material, and means operable by the oscillation of said bellows for simultaneously opening said bellows to the atmosphere and closing the passage between said bellows and said chamber.

20. A motor comprising in combination a plurality of pivotally mounted bellows connected with a single crank-shaft, a vacuum chamber, independent ports being provided between said chamber and the respective bellows, and also from said bellows to the atmosphere, and valves controlled by the oscillation of said bellows for controlling said ports.

In testimony whereof, I have hereunto set my hand, in the presence of two witnesses.

EUGENE T. TURNEY.

Witnesses:
WALTER M. BALLUFF,
PAUL H. JOHNSTON.

Copies of this patent may be obtained for five cents each, by addressing the "Commissioner of Patents, Washington, D. C."